United States Patent [19]

Krause

[11] 4,097,103
[45] Jun. 27, 1978

[54] BUSWAY PLUG ASSEMBLY

[75] Inventor: Werner A. Krause, Plantsville, Conn.

[73] Assignee: General Electric Company, New York, N.Y.

[21] Appl. No.: 798,193

[22] Filed: May 18, 1977

[51] Int. Cl.² ............................................. H01R 7/08
[52] U.S. Cl. ................................. 339/22 B; 174/88 B
[58] Field of Search ................. 339/21 R, 22 R, 22 B; 174/88 B

[56] References Cited

U.S. PATENT DOCUMENTS

| 2,262,067 | 11/1941 | Togesen et al. | 174/88 B |
| 3,489,983 | 1/1970 | Ericson et al. | 339/22 B |
| 3,566,331 | 2/1971 | Stanback et al. | 339/22 B |
| 3,884,541 | 5/1975 | O'Nan et al. | 339/22 B |
| 4,009,920 | 3/1977 | Hicks, Jr. et al. | 339/22 B |

Primary Examiner—Neil Abrams
Attorney, Agent, or Firm—Robert A. Cahill; Walter C. Bernkopf

[57] ABSTRACT

A busway plug assembly includes an enclosure mounted at one end to the busway for swinging movement from an open position to a secured closed position with respect to a side opening in the busway housing through which protrude taps individually electrically connected to the various busbars of the busway. A joint floatingly mounted wholly within the enclosure facing a side-opening therein receives the taps as the enclosure is swung to its closed position. A removable enclosure cover affords access for securing the joint pursuant to making electrical connections between the stabs and conductive straps associated with an electrical device also mounted within the enclosure.

9 Claims, 5 Drawing Figures

BUSWAY PLUG ASSEMBLY

BACKGROUND OF THE INVENTION

The present invention is directed to busway plugs which typically function as tap-off units for drawing current from an electrical distribution system in the form of a busway. Busway, such as utilized in industrial applications, comprises an array of high ampacity, essentially rigid busbars individually insulated and mounted within a housing. Busway is fabricated in sections which are electrically and physically joined end-to-end by joints to create long runs. At intervals along these busway runs provisions are made to tap off current from the busbars for powering electrical machinery. Low-current busway plugs typically are equipped with resilient contact jaws which project through an opening in the busway housing and stab onto insulation bared portions of the various busbars. However, for high current applications, resilient contact jaws do not have the requisite contact pressure or present adequate contact surface area to provide a cool running joint with the various busbars. Thus, high-current busway plugs typically utilize a form of bolted joint in making a high ampacity electrical connection with the individual busbars of the busway.

It is a principle object of the present invention to provide an improved high-current busway plug.

Another object of the invention is to provide a busway plug of the above-character, which is convenient and safe to install.

Yet another object of the present invention is to provide a busway plug of the above-character, wherein all current carrying parts are fully enclosed and thus shielded from inadvertent contact by personnel and foreign objects.

An additional object is to provide a busway plug of the above-character which is efficient in design and economical to manufacture.

Other objects of the invention will in part be obvious and in part appear hereinafter.

SUMMARY OF THE INVENTION

In accordance with the present invention, there is provided a high-current busway plug having an enclosure for housing an electrical device to be electrically connected with the individual busbars of a busway. A saddle mounts the enclosure to the busway housing for swinging movement between an open position and a closed position with respect to a side opening in the busway housing. Separate taps in the form of plate-like stabs, individual electrically connected with the various busbars, project through the side opening in the busway housing. A bolted joint assembly is floatingly mounted wholly within the plug enclosure at a location confronting an enclosure opening which registers with the busway housing opening when the plug enclosure is swung to its closed position. The stabs are received by the joint assembly, as are conductive straps leading to an electrical device mounted within the plug enclosure. A cover is removed to expose an opening in the enclosure through which access is gained to the joint for the purpose of torquing a clamping bolt to effect a high-current electrical connection between the busway stabs and the device straps.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Like reference numerals refer to corresponding parts throughout the several views of the drawings.

DETAILED DESCRIPTION

Figure 1:
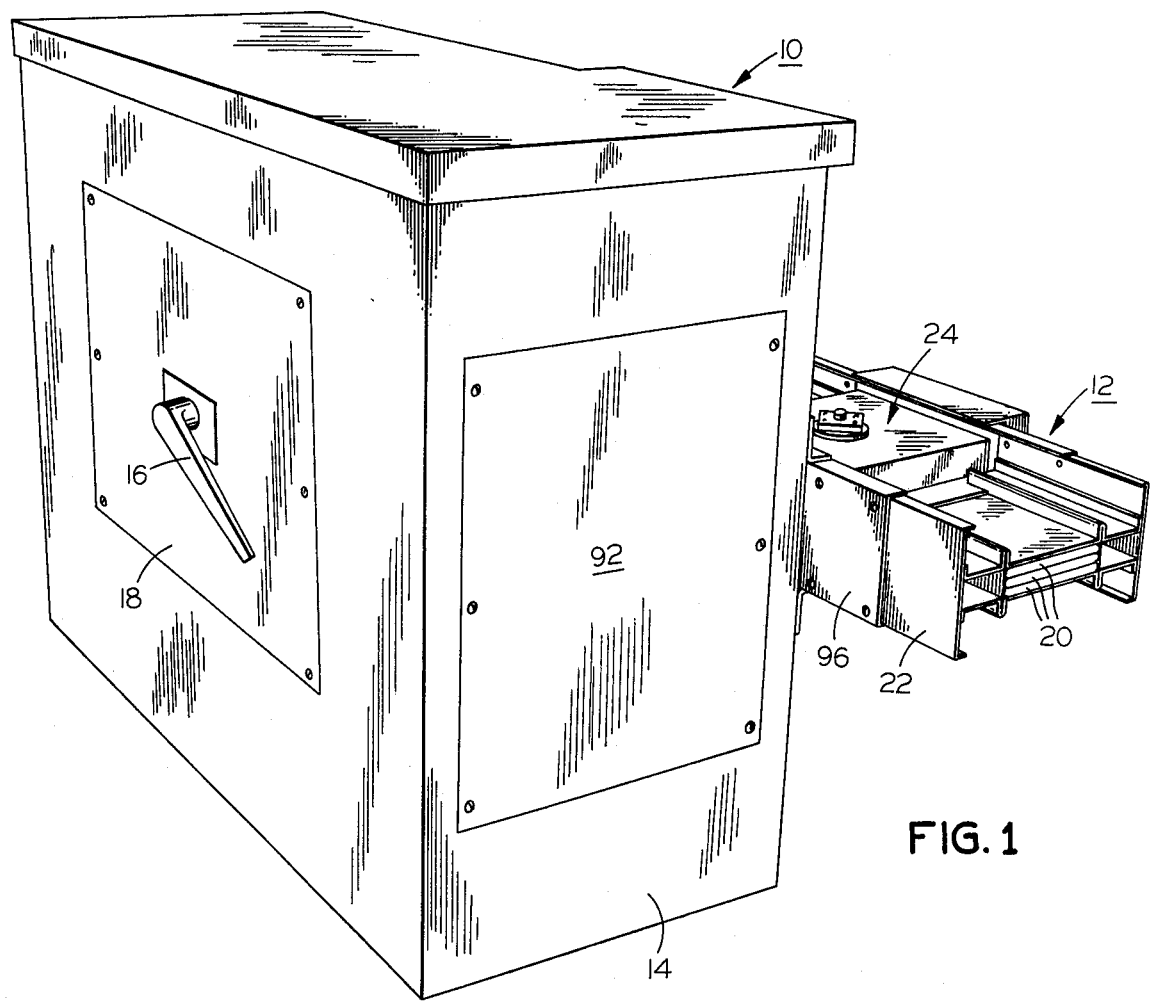
FIG. 1 is a perspective view of a busway plug assembly constructed in accordance with the present invention.

Referring now to the drawings, the busway plug assembly of the invention, generally indicated at 10 in FIG. 1, is utilized to tap off current from a busway, generally indicated at 12, for feeding an electrical device housed within a plug enclosure 14. It will be appreciated that, rather than tap off current, the busway plug may be utilized to apply current to the busway. The electrical device may be a switch or circuit breaker having an operating handle 16 accessible externally of enclosure 14. A cover 18 is removable to gain access to the interior of the enclosure for inspection and maintenance of the electrical device. Busway 12 may be of the construction disclosed in commonly assigned U.S. Pat. No. 3,360,602 wherein a plurality of relatively wide, thin busbars 20, each coated with insulation and placed in direct side-but-side contacting relation, are accommodated within a metallic housing 22. The busway is fabricated in sections which are electrically joined in series by a joint, generally indicated at 24. A suitable busway section joint is disclosed in commonly assigned U.S. Pat. No. 3,376,377.

Figure 2:
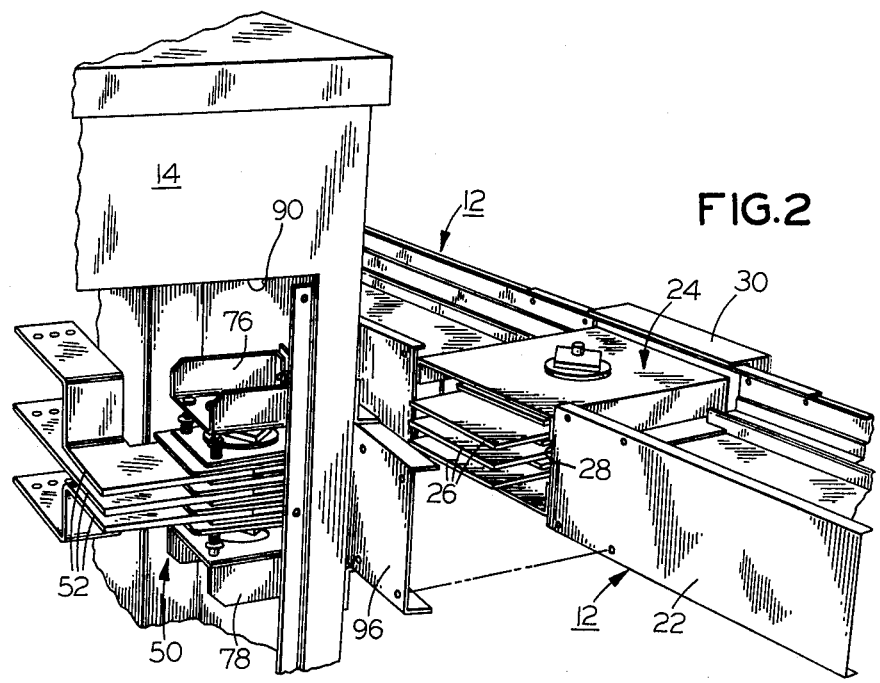
FIG. 2 is a fragmentary perspective view of the busway plug assembly of FIG. 1, illustrated in its open position with respect to the busway.

As a matter of convenience, it is contemplated that busway plug 10 will tap-off from a busway section joint, and, to this end, each of the individual electrical joints between busbars 20 of each busway section also includes a tap in the form of a plate-like conductive stab 26. These stabs, seen in FIG. 2, extend laterally through and beyond an opening or interruption 28 in the continuity of the busway housing 22 occurring at the junction between busway sections and normally bridged by a joint cover member corresponding to the opposed one shown at 30.

Figure 3:
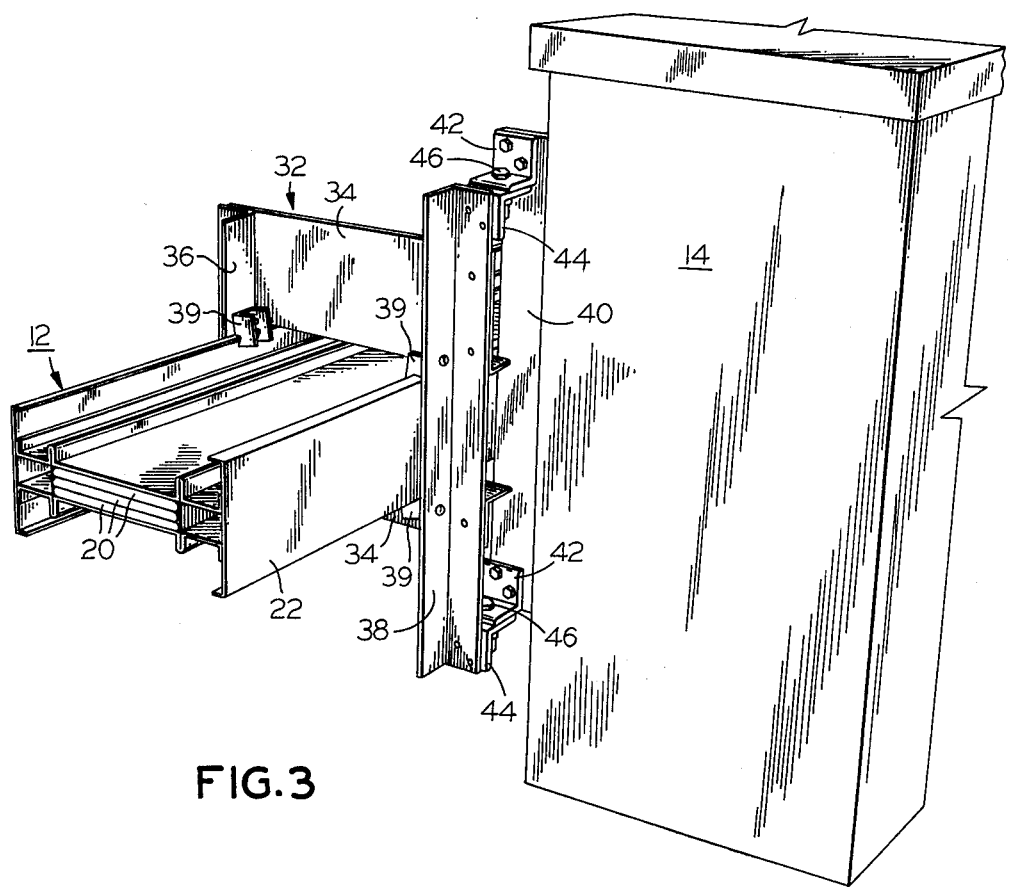
FIG. 3, is a perspective view, partially broken away, of the busway plug assembly of FIG. 1, illustrating its pivotal mounting to the busway.

Referring to FIG. 3, the busway plug 10 is pivotally mounted to busway 12 by way of a four-sided saddle, generally indicated at 32, embracing the busway housing 22. Specifically, the saddle includes upper and lower horizontal members 34 spanning the top and bottom of the busway. The far ends of these horizontal members are joined by a vertical member 36, while the near ends are joined by a longer vertical member 38. Dogs 39 bolted to the vertical members engage the busway housing to securely mount the saddle 32 to the busway. A vertical member 40, affixed to plug enclosure 14, mounts upper and lower hinge brackets 42 which lap with upper and lower hinge brackets 44 affixed to vertical member 38 of saddle 32. The lapped portions of the hinge brackets are provided with holes which, on registry, receive hinge pins 46 pursuant to pivotally mounting the bus plugs to the saddle and thence to the busway. By virtue of this mounting arrangement, the bus plug may be swung between an open position seen in FIG. 2 and a closed position (FIG. 1) with respect to busway housing opening 28.

Figure 4:
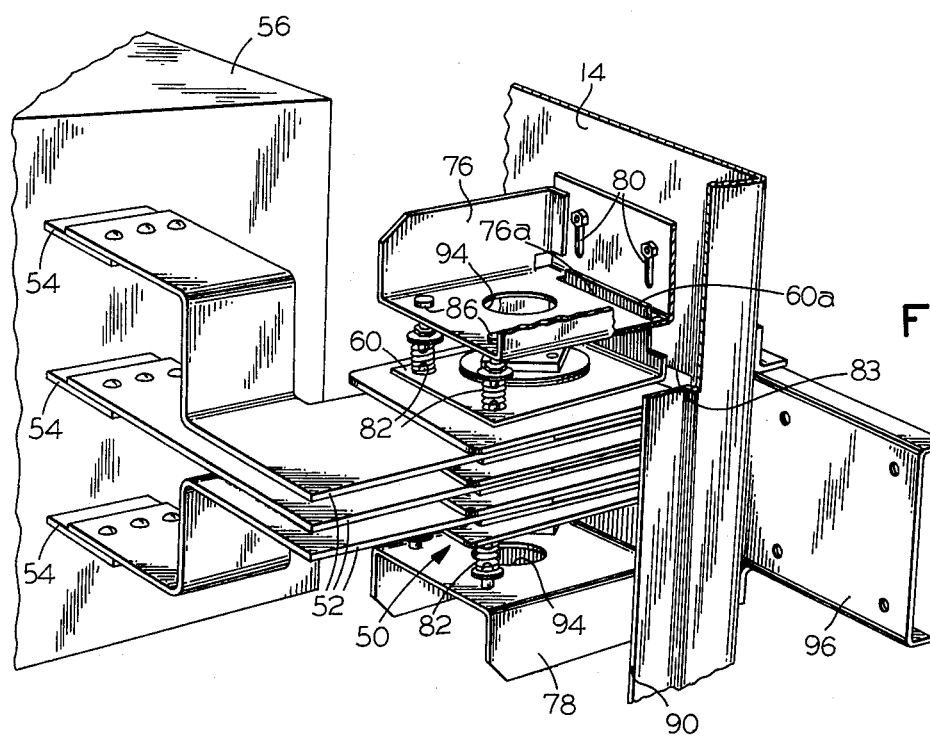
FIG. 4 is a fragmentary perspective view of a bolted joint assembly located within the plug enclosure seen in FIG. 1.
Figure 5:
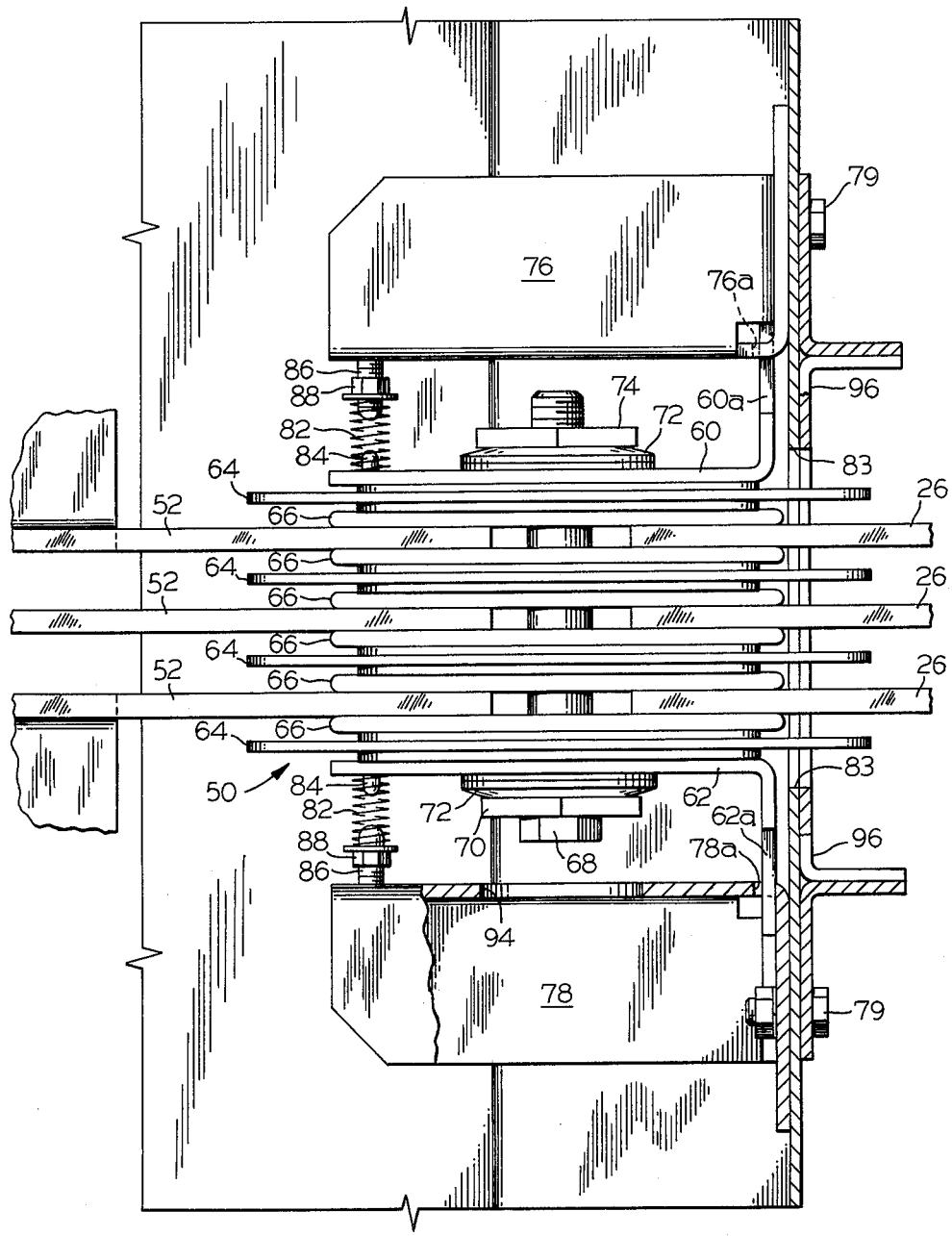
FIG. 5 is an enlarged side elevational view of the bolted joint assembly of FIG. 4.

Turning to FIGS. 4 and 5, mounted within plug enclosure 14 is a joint assembly, generally indicated at 50 and constructed similarly to busway joint 24, which is utilized to perfect an electrical connection between the busway stabs 26 and straps 52 terminating at terminal straps 54 of the electrical device, diagrammatically illustrated at 56. Joint assembly 50 includes an upper pressure plate 60 and a lower pressure plate 62 between which are confined in stacked relation a plurality of plate-like insulators 64 and a plurality of conductive splice plates 66. The busway stabs 26 and the device straps 52 are fitted between contiguous splice plate 66, with the insulators 64 interposed to provided electrical isolation between phases and to electrically isolate the upper and lower situated phases from pressure plates 60, 62. Adjacent insulators and splice plates, as well as adjacent insulators and pressure plates, may be suitably interlocked to preserve their stacked relationship. The insulators and splice plates are also provided with centrally located clearance holes through which a bolt 68 is passed. A flat washer 70 and a Belleville washer 72 are received on the bolt between its head and lower pressure plate 62, while a Belleville washer 72 is interposed between upper pressure plate 60 and a nut 74 threaded on the upper end of bolt 68. The shank of bolt 68 extending between the pressure plates is fitted with an insulating sleeve, as is common practice to isolate the bolt from current carrying parts.

The plug joint assembly 50 is mounted between an upper bracket 76 and a lower bracket 78 affixed to the plug enclosure sidewall by bolts 79. Preferably the bolt holes in upper bracket 76 are in the form of vertically elongated slots 80, seen in FIG. 4, to permit vertical adjustment of this bracket for those installations where the plug joint 50 is vertically expanded to accommodate a neutral busway stab-strap joint, as well as an equipment ground stab-strap joint. In accordance with an important feature of the present invention, the plug joint assembly is floatingly mounted within enclosure 14 between brackets 76, 78 by springs 82 in order to facilitate mating of the joint with the busway stabs 26 entering the plug enclosure 14 through opening 83 as the plug 10 is swung from its open position of FIG. 2 to its closed position of FIG. 1. Specifically, a pair of compression springs 82 is interposed between upper bracket 76 and upper pressure plate 60, while a second pair of compression springs is interposed between lower bracket 78 and lower pressure plate 62. To preserve the positions of the springs 82, lanced out portions 84 of the pressure plates protrude into one of the spring ends, while threaded studs 86, rigidly mounted to the joint brackets for extension toward the plug joint, protrude into the other ends of the springs. Nuts 88, bearing against the other springs ends, are adjustably threaded on the ends of studs 86 to establish a desired spring loading in achieving the appropriate resiliency in the plug joint mounting. Also, it is found desirable to locate the springs only on the side of the plug joint assembly 50 remote from busway 12, and thus the compressive force on the other side of the joint assembly is relaxed to promote facile acceptance of the busway stabs 26. To stabilize the plug joint mounting, upper pressure plate 60 is formed with an upwardly turned extension 60a which is received through a slot 76a formed in upper bracket 76. Similarly lower pressure plate 62 is formed with a downwardly turned extension 62a which is received through a slot 78a in lower bracket 78.

With busway plug 10 in its closed position and the plug joint mated with the device straps and busway stabs, it only remains to torque the joint clamping bolt 68 in order to perfect the electrical joint between the busway and the electrical device 56 within plug enclosure 14. Access to the plug joint is gained through an opening 90 which, in service, is closed off by a cover 92. Holes 94 (FIG. 4) in the joint mounting brackets 76, 78 render the head of bolt 68 and nut 74 readily accessible to appropriate torquing tools. Finally, to complete the physical mounting of the busway plug to the busway, a plate 96 (FIGS. 1 and 2) suitably affixed to and extending beyond the plug enclosure is bolted to the busway housing 22.

It will be appreciated that the busway plug of the present invention can be installed in relative safety while the busway is live. With the plug 10 in its open position and clamping bolt 68 loosened, plug joint 50 can be readily mated with the device straps. The plug is then swung to its closed position, making sure that the electrical device 56 is switched off so that no current can flow as the busway tap straps mate with the plug joint. Since clamping bolt 68 is fully insulated from the live parts of joint, it can be torqued without danger of electrocution.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A busway plug for making an electrical connection with a plurality of taps individually electrically connected to the various busbars of a busway and extending laterally outward from the busway; said plug comprising, in combination:

A. an enclosure;
  B. means for mounting said enclosure in juxtaposition with the busway;
  C. a plurality of conductive straps disposed wholly within said enclosure, a different one of said straps associated with each busway tap;
  D. means forming a window in said enclosure through which the busway taps protrude when said enclosure is juxtaposed with the busway;
  E. a joint mounted within said enclosure, said joint including
   1. a pair of opposed pressure plates,
   2. an array of insulators disposed between said pressure plates,
   3. a pair of conductive splice plates disposed between adjacent pairs of insulators, an associated strap and busway tap being received between each splice plate pair;
   4. means forming registered openings in said pressure plates, insulators and splice plates, and 5. a clamping bolt extending through said openings; and F. means forming an opening in said enclosure to provide access for torquing said bolt to clamp said pressure plates together pursuant to simultaneously perfecting discreet electrical joints between associated ones of said straps and busway taps.

2. The busway plug defined in claim 1, wherein said mounting means includes means pivotally mounting said enclosure to the busway such that said plug may be swung into and out of juxtaposition with the busway.

3. The busway plug defined in claim 1, which further includes means floatingly mounting said joint within said enclosure.

4. The busway plug defined in claim 3, wherein said floatingly mounting means includes a pair of brackets affixed to the enclosure in overlying and underlying relation to said joint, and springs interposed between each said bracket and the adjacent one of said pressure plates.

5. The busway plug defined in claim 4, wherein said springs are located exclusively on the side of said joint opposite from said enclosure window.

6. The busway plug defined in claim 5, wherein each said pressure plate carries laterally turned extension disposed for receipt through a slot formed in said adjacent one of said brackets to stabilize the mounting of said joint by said springs.

7. The busway plug defined in claim 4, wherein said floatingly mounting means includes adjusting means for establishing a desired loading of said springs.

8. The busway plug defined in claim 4, wherein said mounting means includes means pivotally mounting said enclosure to the busway such that said plug may be swung into and out of juxtaposition with the busway.

9. The busway plug defined in claim 8, wherein said enclosure window is located adjacent one end of said enclosure and said pivotally mounting means is located adjacent the other end of said enclosure, and said mounting means further including a plate affixed to said enclosure for extension beyond said one end thereof, said plate having means facilitating affixation to the busway.

* * * * *